W. A. YEATTS.
Automatic-Brake for Wagons.
No. 216,493. Patented June 10, 1879.
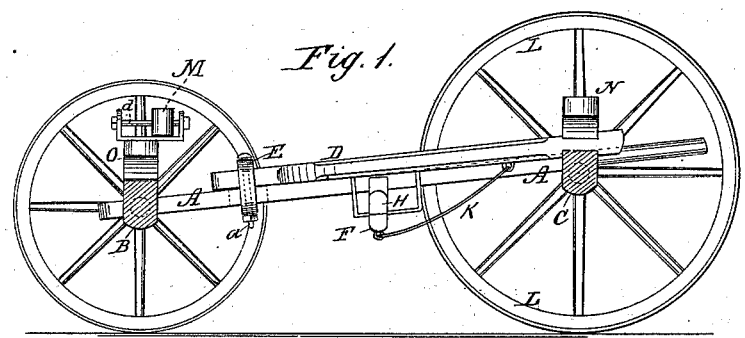
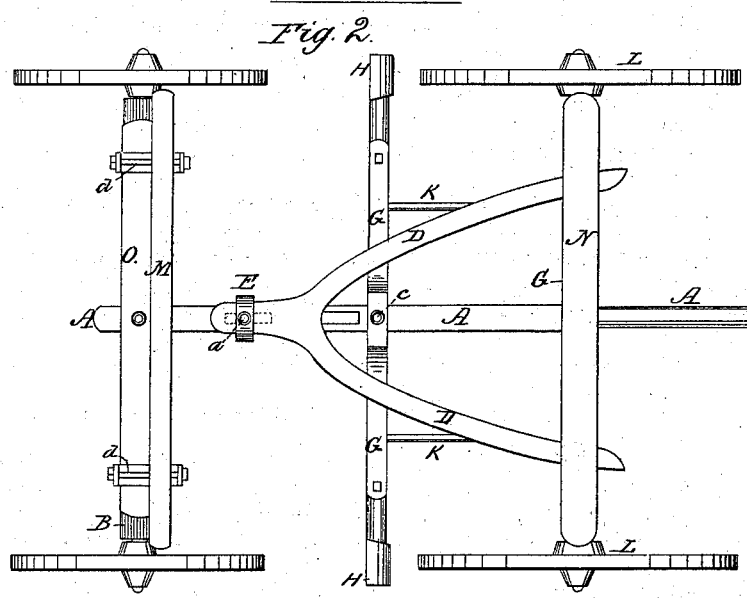
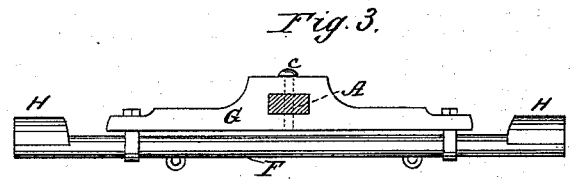
WITNESSES:
W. W. Hollingsworth
John C. Kernon
INVENTOR:
Wm. A. Yeatts
BY
ATTORNEYS.

UNITED STATES PATENT OFFICE.

WILLIAM A. YEATTS, OF LITTLE RIVER, VIRGINIA.

IMPROVEMENT IN AUTOMATIC BRAKES FOR WAGONS.

Specification forming part of Letters Patent No. 216,493, dated June 10, 1879; application filed March 14, 1879.

*To all whom it may concern:*

Be it known that I, WILLIAM ANTHONY YEATTS, of Little River, in the county of Floyd and State of Virginia, have invented a new and Improved Wagon-Brake; and I do hereby declare that the following is a full, clear, and exact description of the same.

My invention is an improvement in the class of wagon-brakes in which the brake-bar is so connected with a sliding perch, or else with a sliding tongue, as to cause the brake to be automatically applied when the horses hold back on descending a grade.

I hinge a rocking brake-bar to a sliding perch, and attach rods to the lower side of the brake-bar, which are also connected with the hounds of the rear axle, so that when the perch slides backward the brake-bar is turned on its axis and caused to lock with the rear wheels. The front bolster is also arranged to slide, to allow for the movement of the perch, all as hereinafter more fully described, and as shown in accompanying drawings, forming part of this specification, in which—

Figure 1 is a longitudinal section, and Fig. 2 a plan, of a running-gear provided with my improvements. Fig. 3 is a detail view of the brake-bar.

The perch A is rigidly connected with the front axle, B, and slides through the rear axle, C. The hounds D of the rear axle are coupled to the perch A by means of a ring, E, and bolt a, the latter passing through the ring and through a lengthwise slot in the perch.

The brake-bar F is hung by hinges from a cross-bar, G, which is adjustable on the perch A, but is held fixed in any adjustment by means of a clamp-screw, c. Its adjustment will cause the brake-shoes H to assume a greater or less angle with the perch when the lock is made, and will thus vary the force with which the brake is applied.

Rods K are attached loosely to the lower side of the brake-bar F and to the hounds D. It will be apparent that when the horses hold back the front axle will be forced back toward the rear one, and the perch A and hounds D will slide on each other, while the rods K will act as push-bars, and simultaneously turn the brake-bar on its hinges, thereby throwing the brake-shoes H over against the rear wheels, L, so that the forward rotation of the latter will effect the desired lock and quickly retard or else arrest the movement of the vehicle.

So soon as the vehicle has passed over the descending grade, the traction exerted by the team will draw the front axle forward and again separate it from the rear axle to the limit allowed by the ring and bolt coupling between the perch A and hounds D, thereby rotating the brake-bar back to its original position and breaking its lock with the wheels.

To allow the bolsters M N to remain fixed in relation to each other while the axles thus approach and recede from each other in the operation of the brake mechanism, as above described, I arrange the front bolster to slide on rods $d$ $d$, which are supported by brackets or arms $e$ $e$, attached to a lower bolster or bolster proper, O.

The said rods $d$ may pass through the front bolster, M, or be otherwise connected with it, as judgment may suggest.

By the construction and arrangement of parts as heretofore described, I form an efficient and cheap automatic brake.

What I claim is—

1. In a wagon-brake, the combination, substantially as shown and described, of the brake-bar, sliding hounds, and rods K, attached to the brake-bar and to the rear hounds, so that when the rear axle forces forward the rods will then rotate the brake-bar and effect the lock, as specified.

2. In a wagon-brake, the combination, substantially as shown and described, of the front bolster and the rods $d$ $d$, supported by brackets, so that said bolster will slide on the rods and brackets, as specified.

WILLIAM ANTHONY YEATTS.

Witnesses:
T. K. DE WITT,
P. W. WHITLOCK.